(12) United States Patent
Brust et al.

(10) Patent No.: US 8,997,493 B2
(45) Date of Patent: Apr. 7, 2015

(54) AUXILIARY POWER UNIT GENERATOR

(71) Applicant: Hamilton Sundstrand Corporation, Windsor Locks, CT (US)

(72) Inventors: Eric A. Brust, Machesney, IL (US); Eric A. Nager, El Cajon, CA (US); Ted A. Martin, Byron, IL (US); Jake A. Rohrig, Rockford, IL (US); Brady A. Manogue, Beliot, WI (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 233 days.

(21) Appl. No.: 13/771,878

(22) Filed: Feb. 20, 2013

(65) Prior Publication Data

US 2014/0230439 A1 Aug. 21, 2014

(51) Int. Cl.
*F01B 21/04* (2006.01)
*H02P 9/04* (2006.01)
*B64D 41/00* (2006.01)

(52) U.S. Cl.
CPC ...................................... *B64D 41/00* (2013.01)

(58) Field of Classification Search
USPC ..... 60/698, 721; 290/1 R, 1 A, 4 R, 4 A, 4 C, 290/4 D
See application file for complete search history.

(56) References Cited

U.S. PATENT DOCUMENTS

| 5,150,568 | A | * | 9/1992 | White | 60/797 |
| 5,430,362 | A | * | 7/1995 | Carr et al. | 318/779 |
| 7,849,680 | B2 | * | 12/2010 | Shaff et al. | 60/295 |
| 2010/0186373 | A1 | * | 7/2010 | Pierz et al. | 60/274 |
| 2013/0232989 | A1 | * | 9/2013 | Osorio | 60/779 |

* cited by examiner

*Primary Examiner* — Hoang Nguyen
(74) *Attorney, Agent, or Firm* — Cantor Colburn LLP

(57) ABSTRACT

A generator includes a main cavity and a shaft located in the main cavity. The shaft is configured to be connected to an auxiliary power unit (APU) and rotated by the APU. The generator is configured to generate power based on the rotation of the shaft. A fluid system is configured to receive a fluid from the APU, flow the fluid through the main cavity and return the fluid to the APU through a fluid scavenge channel. A filter is configured to filter the fluid from the main cavity to the fluid scavenge channel and a sensor is configured to detect a characteristic of the fluid at the filter.

17 Claims, 3 Drawing Sheets

AUXILIARY POWER UNIT GENERATOR

BACKGROUND OF THE INVENTION

Embodiments of the invention relate to an auxiliary power unit (APU) generator, and in particular to an APU generator having a shared oil system with the APU, a screen and a monitoring system in the APU generator to filter scavenged oil and to detect stoppages.

In large power systems including power systems in large vehicles, such as aircraft and large ground-based or water-based vehicles, a main power unit provides propulsion to the vehicle and may provide power to systems in the vehicle. An auxiliary power unit (APU) provides power to one or more systems in the vehicle without providing propulsion. For example, in an aircraft, a main power unit may drive engines and may also power one or more electrical systems, and an APU may provide redundant power to the electrical systems as well as providing power to one or more additional electrical systems, without driving the engines.

BRIEF DESCRIPTION OF THE INVENTION

Embodiments of the present invention include a generator including a main cavity and a shaft located in the main cavity. The shaft is configured to be connected to an auxiliary power unit (APU) and rotated by the APU. The generator is configured to generate power based on the rotation of the shaft. A fluid system is configured to receive a fluid from the APU, flow the fluid through the main cavity and return the fluid to the APU through a fluid scavenge channel. A filter is configured to filter the fluid from the main cavity to the fluid scavenge channel and a sensor is configured to detect a characteristic of the fluid at the filter.

Embodiments of the invention further include a power generation system. The power generation system includes an auxiliary power unit (APU) configured to rotate a shaft and a generator configured to generate power based on a rotation of the shaft. The generator includes a fluid inlet configured to receive a fluid from the APU, a fluid outlet configured to output the fluid to the APU and a channel between the fluid inlet and the fluid outlet configured to direct the fluid to the fluid outlet. The filter is located along the channel configured to filter the fluid. The generator also includes a sensor configured to detect a characteristic of the fluid in the channel, the characteristic corresponding to the flow of the fluid through the filter.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In auxiliary power systems in which an oil system transfers oil from an auxiliary generator to an auxiliary power unit, debris from the auxiliary generator may damage components of the auxiliary power unit. Embodiments of the invention relate to an auxiliary generator including filter and sensor that filter the scavenged oil from the auxiliary generator and provide notifications when the filter requires servicing.

Figure 1:
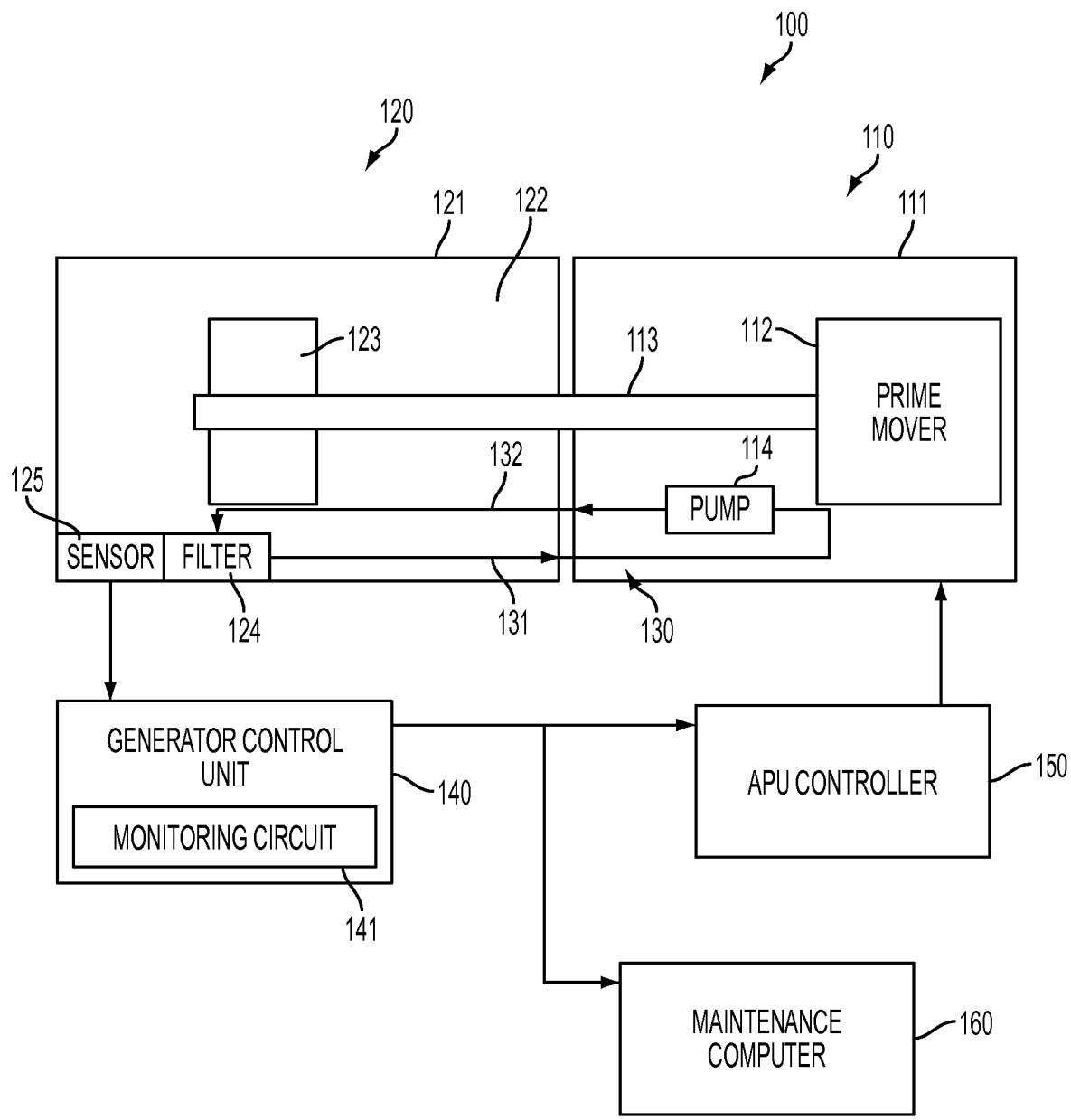
FIG. 1 illustrates a power generation system according to an embodiment of the invention.

FIG. 1 illustrates an auxiliary power generation system 100 according to an embodiment of the invention. The system 100 includes an auxiliary power unit (APU) 110 and an auxiliary generator 120. The system 100 also includes a generator control unit (GCU) configured to control the auxiliary generator 120, such as by controlling excitation or other inputs to the auxiliary generator 120. The system also include an APU controller 150, such as a Full Authority Digital Engine Controller (FADEC) 150, to control the APU 110.

The APU 110 includes a housing 111, a prime mover 112 and a shaft 113. The prime mover 112 may include any type of prime mover including a gasoline engine, diesel engine, turbine engine of an aircraft or any other type of prime mover 112. The prime mover 112 rotates the shaft 113. The shaft 113 extends into the auxiliary generator 120, or connects to a shaft of the auxiliary generator 120.

The auxiliary generator 120 includes a housing 121 defining a main cavity 122. The shaft 113 from the APU 110 extends into the auxiliary generator 120, or connects to a separate shaft of the auxiliary generator 120. The auxiliary generator 120 includes a power generation structure 123 that generates power based on the rotation of the shaft 113. In one embodiment, the power generation structure 123 includes a magnetic field generator, including permanent magnets connected to the stator and wound coils in the power generation structure 123 that interact with the permanent magnets rotating with the shaft 113 to generate power. However, embodiments of the invention encompass any type of power generation structure 123 capable of generating power based on the rotation of a shaft 113 rotated by the prime mover 112 of an APU 110.

The system 100 further includes a fluid system 130 that transmits a fluid from the APU 110 to the auxiliary generator 120, scavenges the fluid from the auxiliary generator 120 and returns the scavenged fluid from the auxiliary generator 120 to the APU 110. In one embodiment, the fluid is oil, which may act as one or both of a coolant and a lubricant to cool and/or lubricate the components of the APU 110 and the auxiliary generator 120. The fluid lubricates the components of the APU 110, is provided to an inlet of the auxiliary generator 120 and travels along a flow path 132 in a first direction through the main cavity 122 to lubricate the components in the main cavity 122, such as the shaft 113 and components of the power generation structure 123 that rotate together with the shaft or interact with rotating components. The fluid then flows through a filter 124 and along a flow path 131 in a second direction opposite the first direction to flow back into the APU 110. The APU 110 includes a pump 114 to control the flow of the fluid through the fluid system 130.

The filter 124 may be, for example, a screen or other filter capable of preventing the passage of particles and debris larger than a predetermined size to prevent damage to components of the APU 110. In embodiments of the invention, a sensor 125 detects characteristics of the fluid in or around the filter 124 to detect stoppages at the filter 124. For example, the sensor 125 may be a temperature sensor to detect a temperature of oil at in inflow side of the filter 124 or an outflow side of the filter 124. In such an embodiment, the monitoring circuit 141 may detect whether the temperature of the oil is above a predetermined threshold and may output a notice to a user or system, such as a maintenance computer 160, that the filter 124 requires maintenance. In addition, the GCU 140 may notify the APU controller 150 of the filter 124 based on the signal from the sensor 125.

Figure 2:
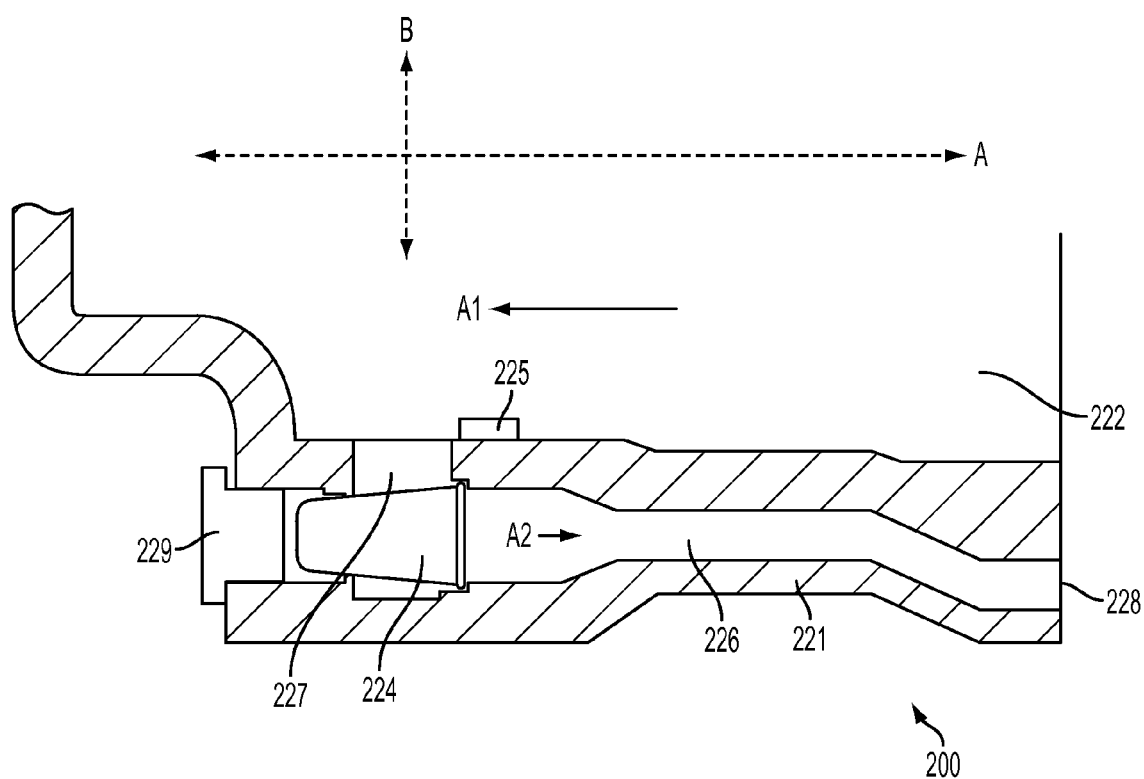
FIG. 2 illustrates a portion of a generator according to an embodiment of the invention.

FIG. 2 illustrates a portion of the auxiliary generator 200, also referred to as a generator 200, according to one embodiment of the invention. The generator 200 may correspond to the auxiliary generator 100 of FIG. 1. The generator 200 includes a housing 221, or wall 221, defining the main cavity 222. Although not illustrated in FIG. 2, the main cavity 222 houses a rotating shaft, power generating structures, such as stators, wound coils, permanent magnets, bearings and any other structures or mechanisms configured to generate electrical power. The wall 221 defines a first channel 226 that is substantially axial along the axis A, which corresponds to a center axis of the generator 200 or the rotation axis of a shaft in the main cavity 222.

The wall 221 further defines a second channel 227 that extends substantially radially along the radial axis B perpendicular to the axis A. In one embodiment, a filter 224 is located at an intersection of the first channel 226 and the second channel 227, such that an open end of the filter 224 faces the first channel 226 and sides of the filter 224 extend into the second channel 227. A sensor 225 is located in the vicinity of the filter 224 to detect characteristics of a fluid adjacent to the filter 224. In particular, the sensor 225 detects whether the filter is clogged and requires replacing, or whether any other blockage exists in the first or second channels 226 or 227. The sensor 225 may be any type of sensor capable of detecting a blockage state of the filter 224, including temperature sensors, optical sensors or any other type of sensors.

While a sensor 225 is illustrated in FIG. 2 as being located in the main cavity 222, it is understood that embodiments of the invention encompass a sensor 225 located in the main cavity 222, in the first channel 227 or in the second channel 226. In other words, embodiments of the invention encompass any configuration of the sensor as long as the sensor is capable of detecting a characteristic of a fluid flow at the filter 224. In addition, while FIG. 2 illustrates two channels 226 and 227, embodiments of the invention encompass any configuration of channels, including one curving channel. In addition, while FIG. 2 illustrates a cone-shaped filter having a rounded apex, embodiments of the invention encompass filters of any shape, including cylindrical, flat planar filters, cone filters having a pointed apex or any other shape.

The generator 200 further includes a plug or cap 229 that closes an end of the first channel 226. The plug 229 may create a fluid-tight seal with the housing 221 to prevent fluid from leaking out of the first channel 226. The plug 229 may be secured by threads, ridges or any other mechanism for securing the plug 229 in place, and permitting the plug 229 to be removed from the housing 221 without damaging either the plug 229 or the housing 221.

While FIG. 2 illustrates the first channel 226 formed in the wall 221 of the generator 200, embodiments of the invention encompass a first channel 226 that is a tube or hose located outside the housing 221 of the generator connected to an opening in the wall 221. In such an embodiment, the filter 224 may be located inside the housing 221 or outside the housing 221 between the main cavity 222 and the first channel 226.

In operation, fluid flows from an auxiliary power unit into the main cavity 222, and the fluid flows in a first direction A1 through the main cavity 222 to provide lubrication to the components, such as shaft and other power generating components, in the main cavity 222. The fluid then flows into the second channel 227 and through the filter 224 to be scavenged for re-use in the auxiliary power unit. As the fluid flows through the filter 224, the sensor 225 detects characteristics of the fluid indicative of a level of blockage of particles and debris in the filter 224. If the filter 224 is blocked by debris, insufficient fluid may flow into the first channel 226 and into the auxiliary power unit, which may result in damage to components of the generator. The sensor 225 may detect a temperature of the fluid, may optically detect blockage of the filter 224 or may detect a level of blockage in any other manner. Signals from the sensor 225 may be sent to a monitoring circuit to detect blockages based on the sensor 225 signals. In such a case, the filter 224 may be accessed by removing the plug 229 to remove and replace the filter 224 or to clean the filter 224.

After passing through the filter 224, the fluid flows in a second direction A2 through the first channel 226 to the outlet 228. The outlet 228 connects to the auxiliary power unit to supply the scavenged fluid back to the auxiliary power unit.

Figure 3:
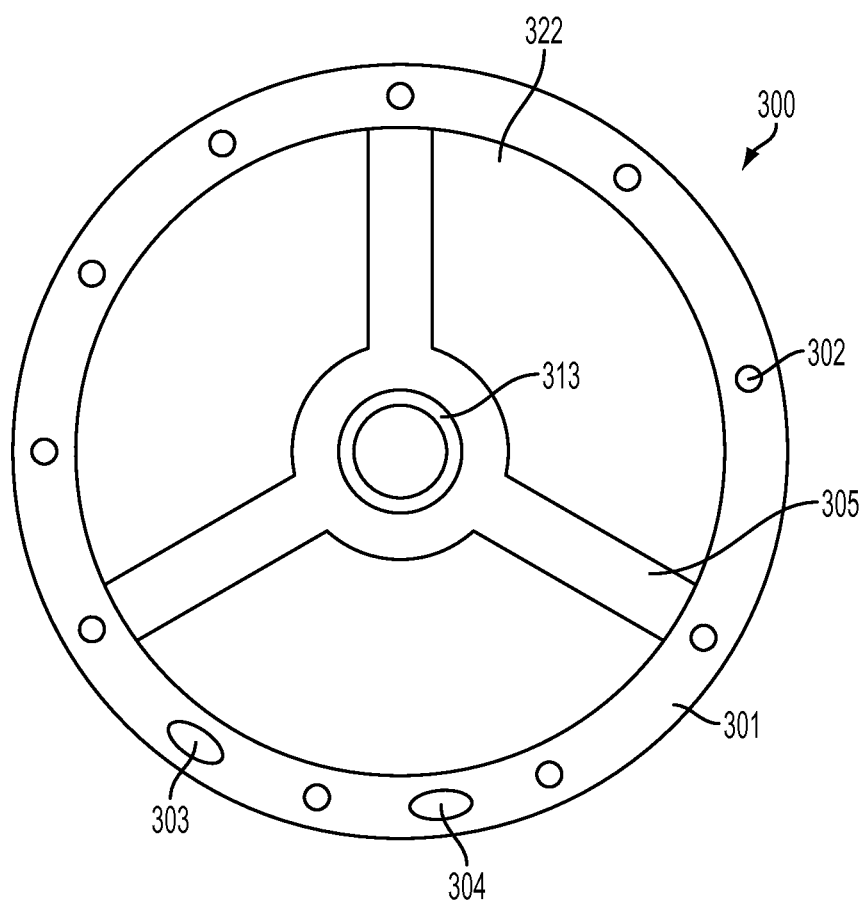
FIG. 3 illustrates an end of a generator according to an embodiment of the invention.

FIG. 3 illustrates an end of an auxiliary generator 300, also referred to as a generator 300, according to one embodiment. The generator 300 may correspond to the generator 100 or 200 of FIG. 1 or 2. The generator 300 includes an end surface 301, which may be a flange, for example, having holes 302 for receiving bolts or other fixing mechanisms. The end surface 301 is configured to connect to a complementary end surface of an auxiliary power unit to form a fluid-tight seal with the auxiliary power unit.

The end surface 301 also includes an inlet 303 to receive a fluid from the auxiliary power unit and an outlet 304 to output scavenged fluid to the auxiliary power unit. The inlet 303 may be in fluid communication with the main cavity 322 to transmit the fluid from the inlet 303 to the main cavity 322. The fluid may then be scavenged, as illustrated in FIGS. 1 and 2, and transmitted to the auxiliary power unit via the outlet 304.

FIG. 3 also illustrates a support structure 305 and shaft 313 that rotates within the support structure 305 at an end of the generator 300. Other internal components of the generator 300 are omitted for purposes of clarity in description.

According to embodiments of the invention, a fluid system, such as a lubricating oil system, circulates a fluid from an auxiliary power unit to a generator and from the generator to the auxiliary power unit. A filter located in the generator filters the fluid to prevent debris and other particles from passing from the generator to the auxiliary power unit. A sensor located adjacent to the filter detects a blockage of the filter, and a monitoring circuit generates a notification signal to notify a user or system that the filter is blocked or in need of cleaning or replacement. Accordingly, the auxiliary power unit may be protected from damage from debris from the generator. In addition, a filter may be monitored to prevent blockages to the filter that may damage the auxiliary power unit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A generator comprising:
a main cavity;

a shaft located in the main cavity and configured to be connected to an auxiliary power unit (APU) and rotated by the APU, the generator configured to generate power based on the rotation of the shaft;

a fluid system configured to receive a fluid from the APU, flow the fluid through the main cavity and return the fluid to the APU through a fluid scavenge channel;

a filter configured to filter the fluid from the main cavity to the fluid scavenge channel; and a sensor configured to detect a characteristic of the fluid at the filter.

2. The generator of claim 1, wherein the sensor is a temperature sensor connected to a monitoring circuit, the monitoring circuit configured to generate a notice when a detected temperature of the fluid at the filter exceeds a threshold temperature.

3. The generator of claim 1, wherein the fluid system includes a fluid inlet connected to an outlet of the APU and a fluid outlet connected to an inlet of the APU, the fluid inlet in fluid communication with the main cavity and the fluid outlet in fluid communication with the fluid scavenge channel.

4. The generator of claim 3, wherein the fluid inlet and the fluid outlet are locate at a first end of the generator and the filter is located at a second end of the generator opposite the first end.

5. The generator of claim 3, wherein the generator is configured to direct the fluid in a first direction through the main cavity and in a second direction opposite the first direction through the channel.

6. The generator of claim 5, wherein the filter is located between the main cavity and the fluid outlet.

7. The power generation system of claim 5, wherein at least a portion of the channel extends axially through a wall of the generator from the second end of the generator to the first end of the generator.

8. The generator of claim 1, further comprising an access plug configured to plug an opening in a wall of the generator, and configured to be removable to expose the opening in the wall of the generator to allow for removal of the filter from the generator.

9. A power generation system, comprising:
an auxiliary power unit (APU) configured to rotate a shaft; and
a generator configured to generate power based on a rotation of the shaft, the generator comprising:
a fluid inlet configured to receive a fluid from the APU;
a fluid outlet configured to output the fluid to the APU;
a channel between the fluid inlet and the fluid outlet configured to direct the fluid to the fluid outlet;
a filter located along the channel configured to filter the fluid; and
a sensor configured to detect a characteristic of the fluid in the channel, the characteristic corresponding to the flow of the fluid through the filter.

10. The power generation system of claim 9, wherein the fluid is at least one of cooling and lubricating oil configured to flow across rotating components of the APU and the generator that rotate based on the rotation of the shaft.

11. The power generation system of claim 9, wherein the fluid inlet and the fluid outlet are located in a first end surface of the generator, the first end surface configured to sealingly connect to an end surface of the APU to prevent fluid from leaking during operation of the APU and the generator.

12. The power generation system of claim 9, wherein the filter is located at a second end of the generator opposite the first end, wherein the generator is configured to direct a flow of the fluid around the shaft in a first direction from the first end to the second end, and along the channel in a second direction from the second end to the first end.

13. The power generation system of claim 12, wherein the generator includes a cavity in which the shaft rotates, and the channel is in fluid communication with the cavity at the second end of the generator.

14. The power generation system of claim 12, wherein at least a portion of the channel extends substantially axially through a wall of the generator from the second end to the first end of the generator.

15. The power generation system of claim 9, further comprising an access plug configured to plug an opening in a wall of the generator, and configured to be removable to expose the opening in the wall of the generator to allow for removal of the filter from the generator.

16. The power generation system of claim 9, wherein the sensor is a thermal sensor configured to detect a temperature of the fluid adjacent to the filter.

17. The power generation system of claim 9, further comprising:
a monitoring circuit configured to receive a detection signal from the sensor, to compare the detected signal with a threshold signal level and to generate a notification based on determining that the detection signal exceeds the threshold signal level.

* * * * *